United States Patent [19]

Asada

[11] Patent Number: 4,845,358
[45] Date of Patent: Jul. 4, 1989

[54] SYNCHRONIZING DEVICE FOR LASER PRINTER

[75] Inventor: Kenichirou Asada, Tokyo, Japan

[73] Assignee: Ricoh Co., Ltd., Tokyo, Japan

[21] Appl. No.: 197,466

[22] Filed: May 23, 1988

[30] Foreign Application Priority Data

May 28, 1987 [JP] Japan ................. 62-132733

[51] Int. Cl.$^4$ ............ H01J 3/14; H01J 5/16; H01J 40/14
[52] U.S. Cl. ................ 250/235; 250/236; 358/494; 346/154
[58] Field of Search ............ 250/234, 235, 236; 350/6.1, 6.8, 6.9; 358/293, 294; 346/154, 160; 364/518, 519

[56] References Cited

U.S. PATENT DOCUMENTS

| 4,449,046 | 5/1984 | Zuckerman et al. | 358/293 |
| 4,539,478 | 9/1985 | Sano | 250/235 |
| 4,720,632 | 1/1988 | Kaneko | 250/235 |

Primary Examiner—David C. Nelms
Assistant Examiner—William L. Oen
Attorney, Agent, or Firm—Cooper & Dunham

[57] ABSTRACT

A synchronizing device is used in a laser printer which comprises a polygonal mirror for periodically deflecting a laser beam which scans a scanning plane and a photodetector provided on the scanning plane outside a region in which a printing is made by the laser beam for outputting an output signal when the laser beam is detected. The output signal of the photodetector is used for producing an image scan clock signal which synchronizes each scan of the laser beam. The synchronizing device comprises a pulse generating circuit for generating a plurality of pulse signals having a frequency identical to that of the image scan clock signal and having phases which are successively shifted by a constant phase with respect to each other, a clock selecting circuit for selectively outputting one of the plurality of pulse signals generated by the pulse generating circuit as the image scan clock signal, and a setting circuit for arbitrarily setting the pulse signal to be selectively outputted from the clock selecting circuit responsive to the output signal of the photodetector.

10 Claims, 6 Drawing Sheets

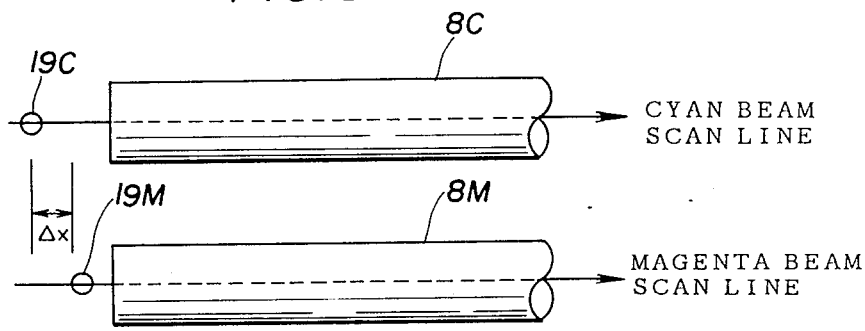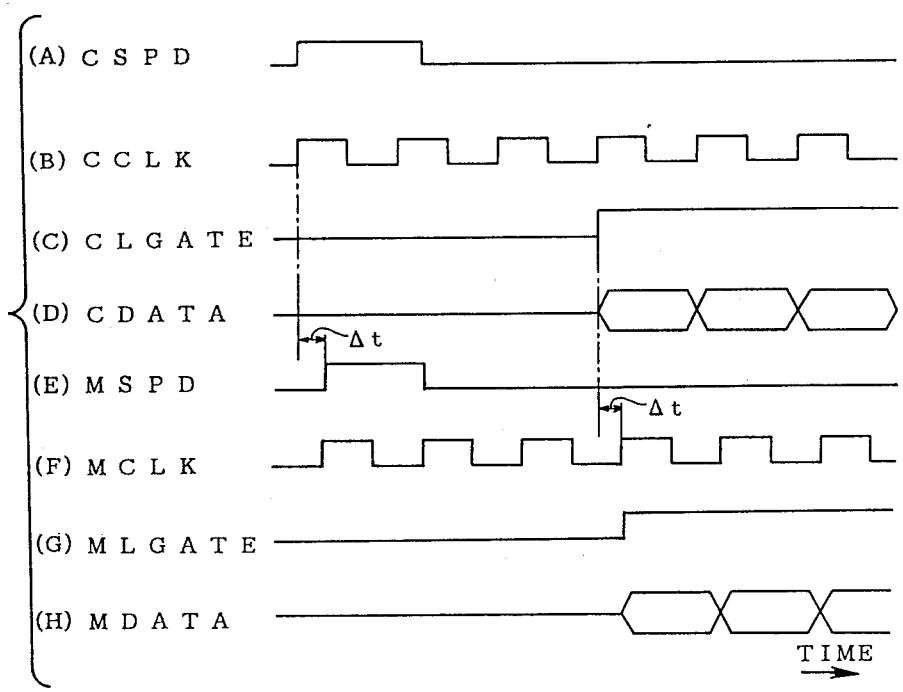

SYNCHRONIZING DEVICE FOR LASER PRINTER

BACKGROUND OF THE INVENTION

The present invention generally relates to synchronizing devices for laser printers, and more particularly to a synchronizing device for controlling exposure positions in a laser printer.

In a laser printer which prints image information by use of a scanning laser beam and especially in a laser printer which uses a plurality of scanning laser beams for the printing, it is important from the point of view of maintaining a high picture quality that print starting positions where each of the laser beams start to print the image information are accurately controlled to coincide with each other. Conventionally, a photodetector is provided at such a position outside an image forming region in which the scanning laser beam prints the image information, so that with each scan the scanning laser beam scans the position of the photodetector before scanning a photosensitive drum. The photodetector outputs a signal when scanned by the laser beam, and a counter starts to count pulses of a master clock signal responsive to this signal from the photodetector. When a counted value of the counter reaches a preset value, the laser beam is controlled to start printing the image information from the print starting position. Hence, the laser beam is always controlled to start the printing from the same print starting position for each scan.

However, when a plurality of laser beams which scan respective photosensitive drums are used for the printing, it is necessary to provide a photodetector with respect to each of the laser beams. In this case, a slight error may occur in the mounting positions of the photodetectors and optical systems. When the mounting error corresponds a time interval which is an integral multiple of the period of the master clock signal, it is possible to control the print starting positions of each of the laser beams to coincide with each other by adjusting the preset value of the counter. But it is impossible to match the print starting positions of the laser beams by simply adjusting the preset value of the counter when the mounting error corresponds to a time interval which is within one period of the master clock signal.

In the case of a laser printer which obtains timing clock signals (image scan clock signals) for determining the print starting positions by frequency-dividing the master clock pulses, it is possible to match the print starting positions of the laser beams even when the mounting error corresponds to the time interval which is within one period of the master clock signal. However, the frequency of the image scan clock signals becomes in the order of 5 MHz in a high-speed laser printer. This means that the frequency of the master clock signal must be in the order of 50 MHz in order to control the print starting positions of the laser beams with a precision within 1/10 dot of the image. But it is impractical to use such a high frequency for the master clock signal.

As a conceivable method of not using the high-frequency master clock signal, it is possible to set the frequency of the master clock signal to a low frequency which is approximately the same as that of the image scan clock signals. In this case, a plurality of kinds of master clock signals are used having the phases thereof successively delayed by a constant value, and a most appropriate kind of master clock signal is selected depending on the output signal of the photodetector. It is possible to accurately control the print starting position of each laser beam without the use of the master clock signal having the high frequency. However, when overlapping a plurality of images such as in the case of a color printing, it is impossible to adjust the relative positions of the images, and an adjustment cannot be carried out to fully compensate for the mounting error corresponding to the time interval which is within one period of the master clock signal.

SUMMARY OF THE INVENTION

Accordingly, it is a general object of the present invention to provide a novel and useful synchronizing device for laser printer in which the problems described heretofore are eliminated.

Another and more specific object of the present invention is to provide a synchronizing device for a laser printer which comprises a polygonal mirror for periodically deflecting a laser beam which scans a scanning plane and a photodetector provided on the scanning plane outside a region in which a printing is made by the laser beam for outputting an output signal when the laser beam is detected, where the output signal of the photodetector is used for producing an image scan clock signal which synchronizes each scan of the laser beam. The synchronizing device comprises pulse generating means for generating a plurality of pulse signals having a frequency identical to that of the image scan clock signal and having phases which are successively shifted by a constant phase with respect to each other, clock selecting means for selectively outputting one of the plurality of pulse signals generated by the pulse generating means as the image scan clock signal, and setting means for arbitrarily setting the pulse signal to be selectively outputted from the clock selecting means responsive to the output signal of the photodetector. According to the synchronizing device of the present invention, it is possible to finely and accurately control the scan starting position of the laser beam, and hence finely control the print starting position on a recording sheet. Hence, it is possible to print an image of a fine picture quality.

Still another object of the present invention is to provide a synchronizing device for a color laser printer which comprises at least a first polygonal mirror for periodically deflecting a first laser beam which scans a first scanning plane, a first photodetector provided on the first scanning plane outside a first region in which a printing is made by the first laser beam for outputting an output signal when the first laser beam is detected, a second polygonal mirror for periodically deflecting a second laser beam which scans a second scanning plane and a second photodetector provided on the second scanning plane outside a second region in which a printing is made by the second laser beam for outputting an output signal when the second laser beam is detected, where the output signal of the first photodetector is used for producing a first image scan clock signal which synchronizes each scan of the first laser beam and the output signal of the second photodetector is used for producing a second image scan clock signal which synchronizes each scan of the second laser beam. The synchronizing device comprises pulse generating means for generating a first plurality of pulse signals having a frequency identical to that of the first image scan clock signal and having phases which are successively shifted by a constant phase with respect to each other and a second plurality of pulse signals having a frequency identical to that of the second image scan clock signal and having phases which are successively shifted by the constant phase with respect to each other, clock selecting means for selectively outputting one of the first plurality of pulse signals generated by the pulse generating means as the first image scan clock signal and for selectively outputting one of the second plurality of pulse signals generated by the pulse generating means as the second image scan clock signal, and setting means for arbitrarily setting the pulse signals to be selectively outputted from the clock selecting means responsive to the output signal of the first and second photodetectors. According to the synchronizing device of the present invention, it is possible to prevent a positioning error from occurring in overlapping color images formed on a recording sheet. Thus, it is possible to print a color image of a high picture quality.

Other objects and further features of the present invention will be apparent from the following detailed description when read in conjunction with the accompanying drawings.

BRIEF DESCRIPTION OF THE DRAWINGS

FIG. 3 schematically shows scanning lines of cyan and magenta beams;

FIGS. 4(A) through 4(H) are timing charts for explaining the problems caused by mounting errors in the mounting positions of photodetectors of the laser printer shown in FIG. 1;

DETAILED DESCRIPTION

Figure 1:
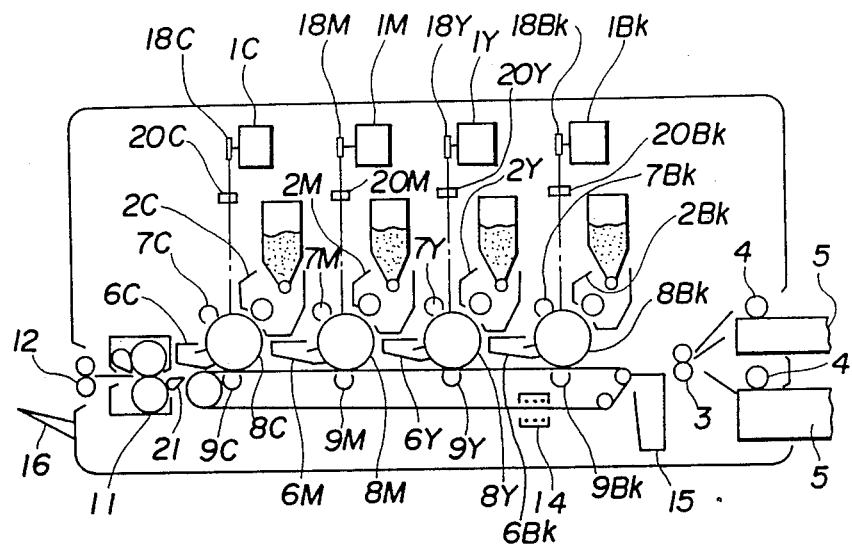
FIG. 1 is a side view in cross section showing an essential part of an embodiment of the laser printer to which the synchronizing device according to the present invention may be applied.
Figure 2:
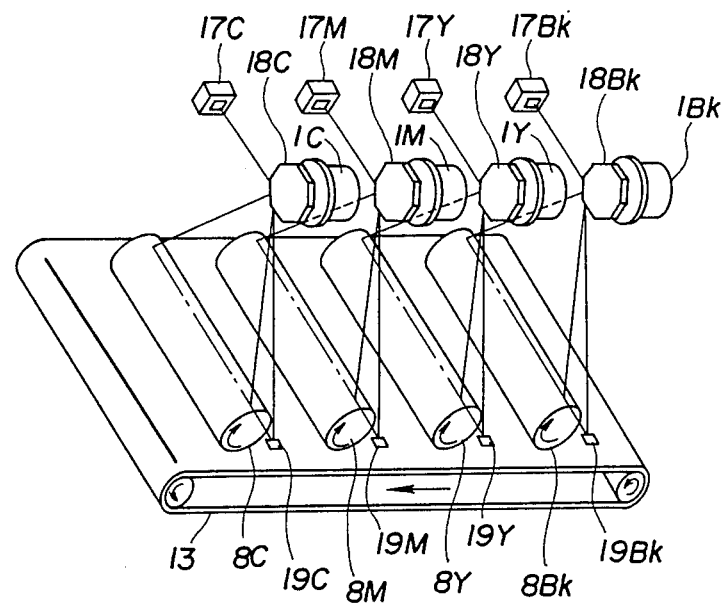
FIG. 2 is a perspective view showing an essential part of an exposure part of the laser printer shown in FIG. 1.

First, a description will be given on an embodiment of the laser printer to which the synchronizing device according to the present invention may be applied, by referring to FIGS. 1 and 2.

Generally, when printing a full color image on a color printer, the colors present in the image to be printed are separated into yellow (Y), magenta (M) and cyan (C). Image signals of yellow, magenta and cyan are respectively received through suitable interfaces, and single color images of yellow, magenta and cyan are generated based on the image signals. The full color image is obtained by overlapping the single color images of yellow, magenta and cyan. It is possible to use an image signal of black (Bk) in addition to the image signals of yellow, magenta and cyan. This image signal of black corresponds to an ink plate used in the color printing.

When equal quantities of yellow, magenta and cyan are combined, the resulting color is black. This means that the same color can be described by a combination of black and two colors out of the yellow, magenta and cyan. The so-called UCR eliminates equal quantities of the yellow, magenta and cyan corresponding to the black, and the replaced black is the ink plate.

In a laser color printer, there is an additional advantage besides the color reproducibility in that the toner consumption is reduced when the UCR is carried out. As a result, the thickness of the output printed image is reduced, and the fixing of the image is satisfactory. Hence, a toner image is generally formed four times and transferred four times onto a recording sheet.

An exposure in the laser color printer will be given in conjunction with FIGS. 1 and 2 by taking the exposure of black (Bk) information as an example. A laser light source 17Bk emits a laser beam modulated by the image signal of black, and this laser beam is deflected by a polygonal mirror 18Bk which is rotated by a motor 1Bk. The deflected laser beam passes through an imaging lens 20Bk and scans a predetermined position on a photosensitive drum 8Bk. This scanning of the laser beam is called a main scan, and this main scan is made in a main scanning direction. The laser beam repeatedly scans the photosensitive drum 8Bk along a scanning line in the same main scanning direction for each scan due to the rotation of the polygonal mirror 18Bk. But since the photosensitive drum 8Bk rotates in the direction of an arrow, the laser beam also scans the photosensitive drum 8Bk in the direction of the arrow. This scanning of the laser beam is called a sub scan, and this sub scan is made in a sub scanning direction. In other words, the laser beam makes a raster scan on the photosensitive drum 8Bk.

The photosensitive drum 8Bk which is initially charged by a corona discharger 7Bk is scanned by the laser beam depending on the image signal, and the charge at portions of the photosensitive drum 8Bk which receive a predetermined exposure energy is eliminated, thereby forming an electrostatic image on the photosensitive drum 8Bk. The charged black toner is deposited on the exposed portions of the photosensitive drum 8Bk by a developer 2Bk, so as to develop the electrostatic image. The developed image is transferred onto a recording sheet.

The exposure process is similarly carried out for each of the colors of yellow, magenta and cyan, and a description thereof will be omitted. In FIGS. 1 and 2, those parts which are essentially the same as those corresponding parts provided for the printing in black are designated by the same reference numerals with subscripts Y, M and C for yellow, magenta and cyan, respectively.

On the other hand, the recording sheet supplied from an arbitrary one of trays 5 by corresponding paper supplying rollers 4 is transported in the direction of an arrow by a transport belt 13. The transport belt 13 is made of Mylar and is driven by a plurality of rollers. Contact points where the the transport belt 13 makes contact with the photosensitive drums 8Bk, 8Y, 8M and 8C correspond to the transfer positions, and the color toners are attracted onto the recording sheet by corresponding transfer dischargers 9Bk, 9Y, 9M and 9C. The recording sheet onto which the color toner images are transferred is separated from the transport belt 13 by a separation claw 21, and passes through a fixing unit 11 using thermal rollers. Hence, the overlapping color toner images on the recording sheet are fixed, and the recording sheet is ejected to a tray 16 by ejecting rollers 12.

The exposure system may use one or two deflectors for carrying out the scan by a plurality of laser beams.

Next, a description will be given on the problems that occur when mounting errors exist in the mounting positions of photodetectors 19Bk, 19Y, 19M and 19C shown in FIG. 2. FIG. 3 schematically shows scanning lines of cyan and magenta beams which are obtained by modulating laser beams by respective image signals of cyan and magenta.

The scanning line of the cyan beam passes the photodetector 19C and scans the photosensitive drum 8C. The scanning line of the magenta beam similarly passes the photodetector 19M and scans the photosensitive drum 8M. When the cyan beam passes the position of the photodetector 19C, the photodetector 19C outputs a cyan beam detection signal CSPD shown in FIG. 4(A). In this case, a cyan image scan clock signal CCLK shown in FIG. 4(B) which is used in common as a master clock signal is generated simultaneously as when the cyan beam detection signal CSPD rises. A counter (not shown) which determines the print starting timing counts pulses of the cyan image scan clock signal CCLK, and outputs a cyan image print enable signal CLGATE shown in FIG. 4(C) when four pulses are counted, for example. A cyan image data CDATA shown in FIG. 4(D) is generated in synchronism with the cyan image print enable signal CLGATE to print the cyan image on the corresponding photosensitive drum 8C. The printing of the magenta image is carried out similarly on the corresponding photosensitive drum 8M. FIG. 4(E) shows a magenta beam detection signal MSPD outputted by the photodetector 19M when the magenta beam passes the position of the photodetector 19M. FIG. 4(F) shows a magenta image scan clock signal MCLK, FIG. 4(G) shows a magenta image print enable signal MLGATE outputted from the counter, and FIG. 4(H) shows a magenta image data MDATA generated in synchronism with the magenta image print enable signal MLGATE.

For convenience' sake, it is assumed that the cyan beam and the magenta beam scan in parallel at the same speed v. In this case, when the photodetectors 19C and 19M for the cyan and magenta beams are mounted at positions deviated by $\Delta x$ as shown in FIG. 3, a time interval $\Delta t$ described by the following formula exists between the cyan beam detection signal CSPD shown in FIG. 4(A) and a magenta beam detection signal MSPD shown in FIG. 4(E).

$$\Delta t = \Delta x / v$$

When the value of the time interval $\Delta t$ corresponds to a time within one period of the cyan image scan clock signal CCLK (that is, master clock signal), it is impossible to make the print starting positions of the cyan and magenta images coincide with each other even when the preset value of the counter is changed. Accordingly, it is necessary to provide means for compensating for the mounting error corresponding to the time within one period of the master clock signal.

Figure 5:
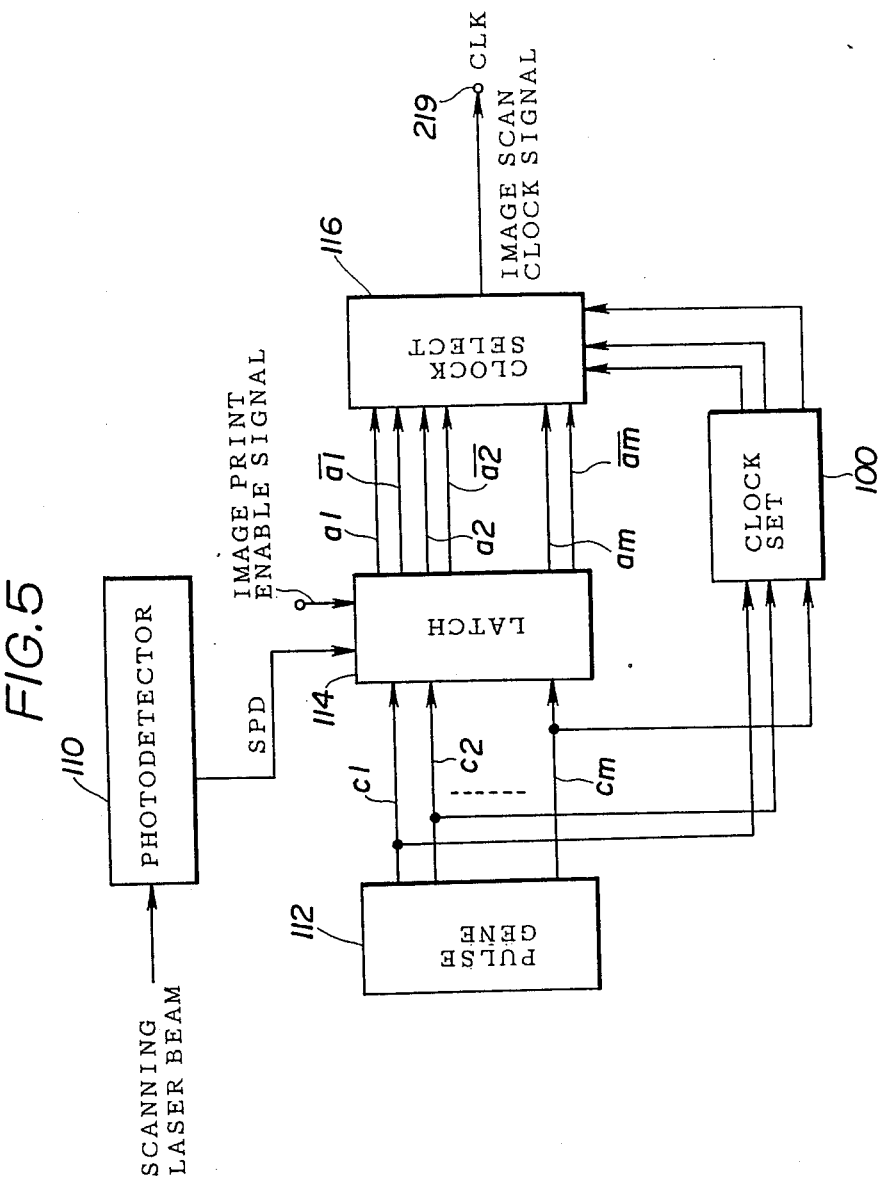
FIG. 5 is a system block diagram showing an embodiment of the synchronizing device according to the present invention.

FIG. 5 shows an embodiment of the synchronizing device according to the present invention applicable to the laser printer described heretofore. A photodetector 110 is located at a position to detect the scanning laser beam before each main scan of the main scanning region, and outputs a beam detection signal SPD which is supplied to a latch circuit 114. The photodetector 110 corresponds to any of the photodetectors 19Bk, 19Y, 19M and 19C described before. In other words, the circuit shown in FIG. 5 is actually provided with respect to each of the photodetectors 19Bk, 19Y, 19M and 19C. A pulse signal generating circuit 112 generates a plurality of pulse signals c1 through cm which have the same frequency as the image scan clock signal CLK but have phases which are successively shifted therefrom. The latch circuit 114 latches the pulse signals c1 through cm in response to the output beam detection signal SPD of the photodetector 110 when enabled by an image print enable signal, and outputs signals a1 through am and complementary signals $\overline{a1}$ through $\overline{am}$. These signals a1 through am and $\overline{a1}$ through $\overline{am}$ are supplied to the clock selecting circuit 116.

One of these plurality of pulse signals c1 through cm which have the same frequency as the image scan clock signal CLK but have phases which are successively shifted therefrom is selected depending on the output signal of the photodetector 110 and is used as the actual image scan clock signal CLK.

In the present embodiment, a clock setting circuit 100 is provided so that signal lines from the pulse signal generating circuit 112 are connectable to signal lines to a clock selecting circuit 116, and one pulse signal can be set to the clock selecting circuit 116 from the clock selecting circuit 116.

Figure 6:
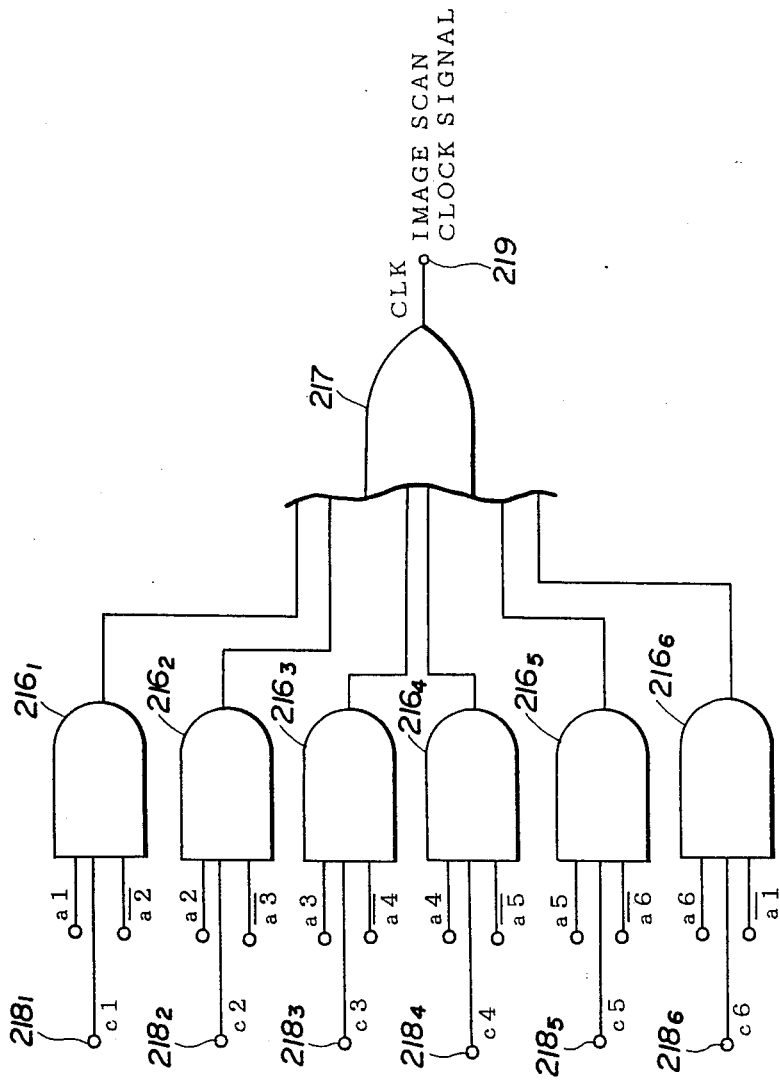
FIG. 6 is a circuit diagram showing an embodiment of a clock selecting circuit within the synchronizing device shown in FIG. 5.

FIG. 6 shows an embodiment of the clock selecting circuit 116 for the case where m=6 in FIG. 5. The clock selecting circuit 116 comprises AND gates $216_1$ through $216_6$ and an OR gate 217. In FIG. 6, when a terminal $218_1$ supplied with the pulse signal c1 is supplied instead with the pulse signal c2, a terminal $218_2$ supplied with the pulse signal c2 is supplied instead with the pulse signal c3, a terminal $218_3$ supplied with the pulse signal c3 is supplied instead with the pulse signal c4, a terminal $218_5$ supplied with the pulse signal c5 is supplied instead with the pulse signal c6, and a terminal $218_6$ supplied with the pulse signal c6 is supplied instead with the pulse signal c1, the pulse signal c4 is selectively outputted from the OR gate 217 and obtained through a terminal 219 as the output image scan clock signal CLK of the clock selecting circuit 116.

When the terminal $218_1$ supplied with the pulse signal c1 is supplied instead with the pulse signal c3, the terminal $218_2$ supplied with the pulse signal c2 is supplied instead with the pulse signal c4, the terminal $218_3$ supplied with the pulse signal c3 is supplied instead with the pulse signal c5, the terminal $218_4$ supplied with the pulse signal c4 is supplied instead with the pulse signal c6, the terminal $218_5$ supplied with the pulse signal c5 is supplied instead with the pulse signal c1, and the terminal $218_6$ supplied with the pulse signal c6 is supplied instead with the pulse signal c2, the pulse signal c5 is selectively outputted from the OR gate 217.

An arbitrary one of the pulse signals c1 through c6 having a predetermined phase relationship with respect to the photodetector 110 can be selectively outputted from the clock selecting circuit 116 by similarly changing the connection, that is, changing the specific terminals which are to receive the pulse signals c1 through cm generated from the pulse signal generating circuit 112.

Figure 7:
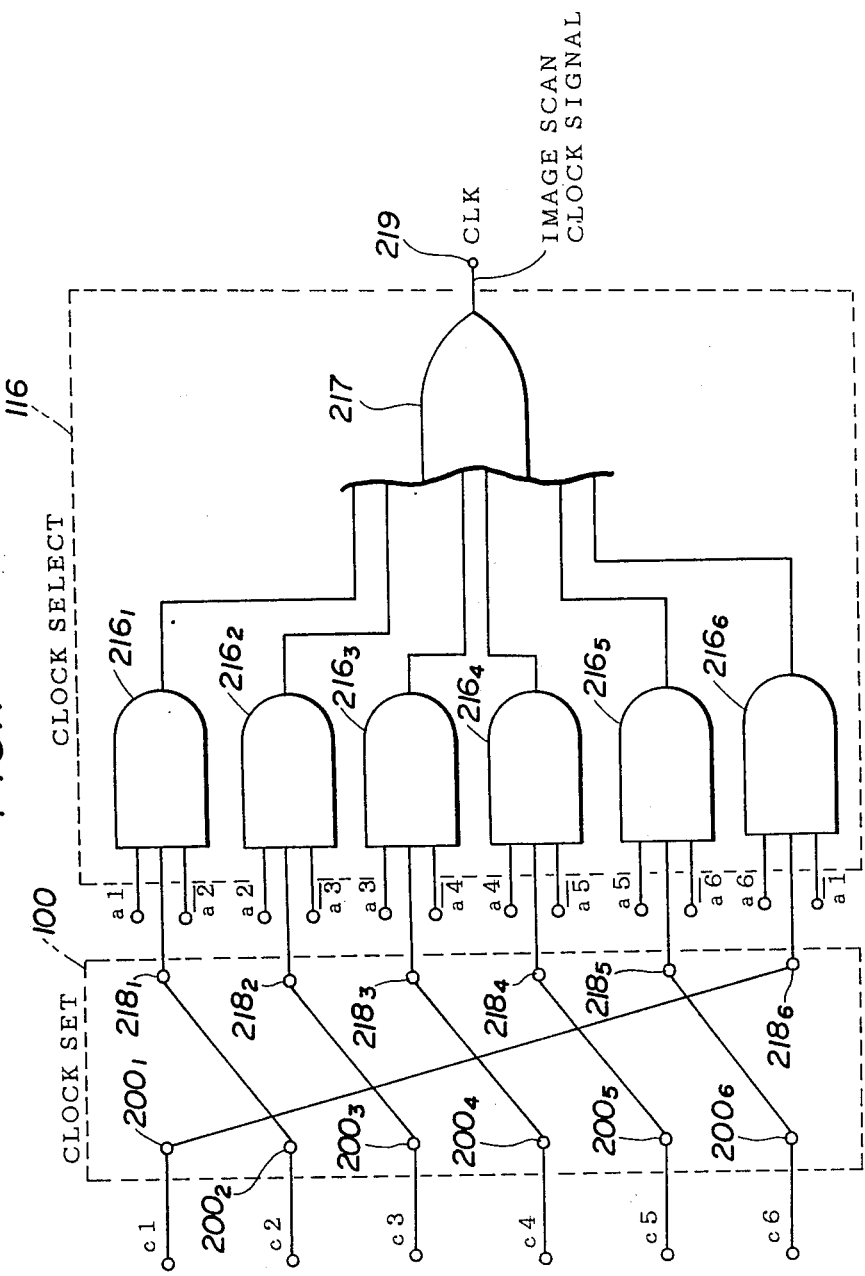
FIG. 7 is a circuit diagram showing an embodiment of a clock setting circuit within the synchronizing device shown in FIG. 5 together with the clock selecting circuit.

FIG. 7 shows an embodiment of the clock setting circuit 100 for the case where m=6 in FIG. 5, together with the clock selecting circuit 116. In FIG. 7, those parts which are the same as those corresponding parts in FIG. 6 are designated by the same reference numerals, and a description thereof will be omitted. The clock setting circuit 100 comprises jumper pins $200_1$ through $200_6$ which are connected to the terminals $218_1$ through $218_6$ depending on which one of the pulse signals c1 through c6 is to be selectively outputted from the clock selecting circuit 116. It is possible to constitute the clock setting circuit 100 by mechanical switches which successively switch terminals thereof to receive the pulse signals c1 through c6 to supply desired ones of the pulse signals c1 through c6 to desired ones of the AND gates $216_1$ through $216_6$ of the clock selecting circuit 116. In addition, it is possible to use selector elements for the clock setting circuit 100.

As described before, the printing of the image is generally started when the counted value of the counter which counts the pulses of the image scan clock signal CLK reaches the preset value.

Accordingly, it is possible to successively shift the print starting position by the distance corresponding to the time interval $\Delta t$ by successively shifting the connections of the clock setting circuit 100 which receives the pulse signals C1 through C6. For this reason, the required adjustment of the print starting position can be made within a step which is even smaller than one period of the image scan clock signal CLK.

Figure 8:
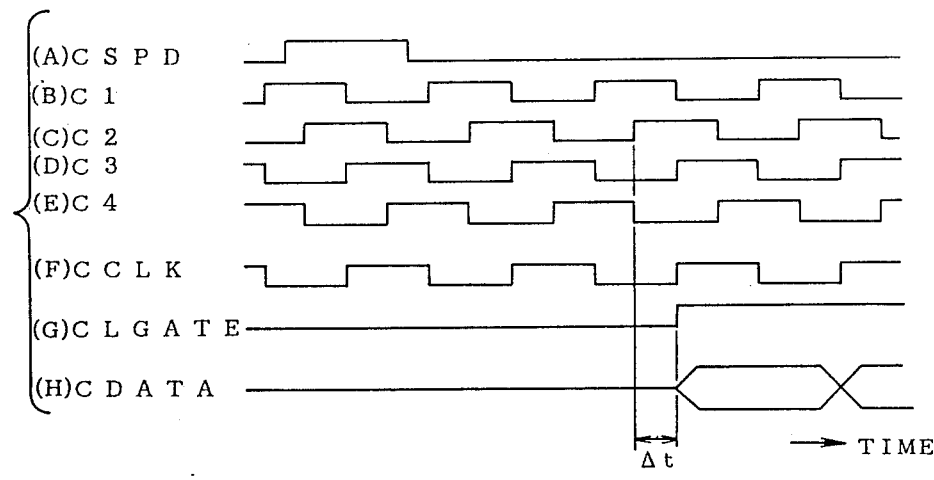
FIGS. 8(A) through 8(H) and FIGS. 9(A) through 9(H) are timing charts for explaining the operation of the synchronizing device shown in FIG. 5.
Figure 9:
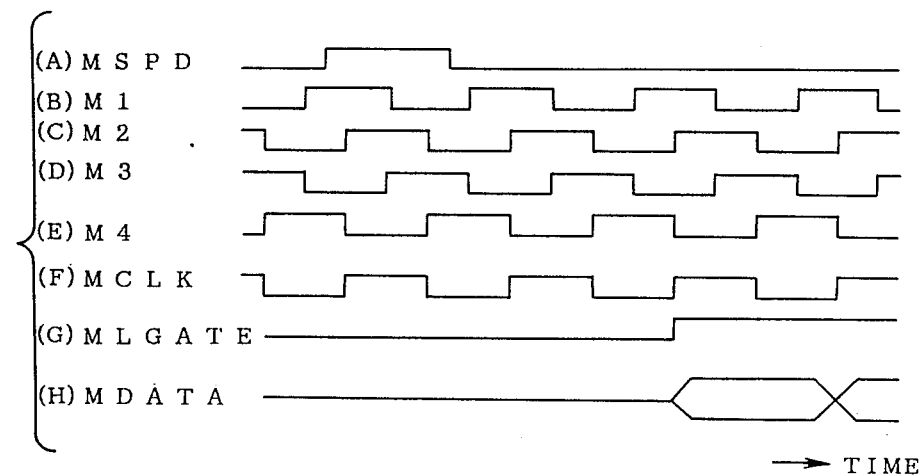

FIGS. 8(A) through 8(H) and FIGS. 9(A) through 9(H) are timing charts for explaining the adjustment of the image scan clock signal in the present embodiment of the synchronizing device according to the present invention. FIG. 8(A) shows a cyan beam detection signal CSPD, and FIGS. 8(B) through 8(E) respectively show master clock signals C1 through C4 having phases which mutually differ by ¼ period thereof. FIG. 8(F) shows a cyan image scan clock signal CCLK. FIGS. 8(G) and 8(H) show a cyan image print enable signal CLGATE and a cyan image signal CDATA, respectively. Similarly, FIG. 9(A) shows a magenta beam detection signal MSPD, and FIGS. 9(B) through 9(E) respective show master clock signals M1 through M4 having phases which mutually differ by ¼ period thereof. FIG. 9(F) shows a magenta image scan clock signal CCLK. FIGS. 9(G) and 9(H) show a magenta image print enable signal MLGATE and a magenta image signal MDATA, respectively.

Depending on the cyan beam detection signal CSPD from the photodetector 19C, one of the master clock signals C1 through C4 from a circuit corresponding to the pulse generating circuit 112 is selected and used as the cyan image scan clock signal. Similarly, one of the master clock signals M1 through M4 from a circuit corresponding to the pulse generating circuit 112 is selected and used as the magenta image scan clock signal depending on the magenta beam detection signal MSPD from the photodetector 19M.

In the case described before in conjunction with FIGS. 4(A) through 4(H), the clock signals C2 and M2 respectively having the closest phases to those of the cyan beam detection signal CSPD and the magenta beam detection signal MSPD are selected as the cyan image scan clock signal CCLK and the magenta image scan clock signal MCLK, respectively. However, due to the mounting error of the photodetectors 19C and 19M or an error in the scanning optical paths of the cyan and magenta beams, the start positions of the cyan image signal CDATA and the magenta image signal MDATA are mutually deviated by the distance corresponding to the time interval $\Delta t$. This distance corresponding to the time interval $\Delta t$ virtually does not change unless an abnormality occurs in the laser printer or a part of the optical system thereof is replaced. From the point of view of the performance of the laser printer, the distance corresponding to the time interval $\Delta t$ can be assumed to be constant.

Accordingly, it is sufficient to merely take some measure to compensate for the time interval $\Delta t$ during an initial adjustment. In the present embodiment, one of the master clock signals (C1 through C4 or M1 through M4) having mutually different phases and prepared for the purpose of sychronizing the phase of the beam detection signal SPD and the phase of the image scan clock signal CLK is selected so as to compensate for the time interval $\Delta t$, in order to match the print starting positions of the different color images.

In other words, if the object were to simply synchronize the phases of the beam detection signal SPD and the image scan clock signal CLK as in the conventional case, it is sufficient to select the master clock signal C2 having the closest phase with respect to the cyan beam detection signal CSPD as the cyan image scan clock signal CCLK and select the master clock signal M2 having the closest phase with respect to the magenta beam detection signal MSPD as the magenta image scan clock signal MCLK. However, this will result in a positional difference corresponding to the time interval $\Delta t$ between the print starting positions of the cyan and magenta images.

For this reason, in the present embodiment, when the master clock signal M2 which rises first after the rise in the magenta beam detection signal MSPD is fixedly selected as the magenta image clock signal MCLK, the initial adjustment is set so that the master clock signal C3 which rises second after the rise in the cyan beam detection signal CSPD is selected as the cyan image clock signal CCLK. As a result, the starting positions of the magenta image signal MDATA and the cyan image signal CDATA always become the same, and it is possible to obtain a color image in which no positioning error occurs in the overlapping color images.

In the present embodiment, the phase difference between the master clock signals is set to ¼ period thereof. For this reason, there may still exist an error in the print starting positions which is at the maximum ¼ period of the master clock signals. In order to more accurately match the print starting positions, more than four kinds of master clock signals having mutually difference phases should be used.

Further, the present invention is not limited to these embodiments, but various variations and modifications may be made without departing from the scope of the present invention.

What is claimed is:

1. A synchronizing device for a laser printer which comprises a polygonal mirror for periodically deflecting a laser beam which scans a scanning plane and a photodetector provided on the scanning plane outside a region in which a printing is made by the laser beam for outputting an output signal when the laser beam is detected, said output signal of the photodetector being used for producing an image scan clock signal which synchronizes each scan of the laser beam, said synchronizing device comprising:

pulse generating means for generating a plurality of pulse signals having a frequency identical to that of the image scan clock signal and having phases which are successively shifted by a constant phase with respect to each other;

clock selecting means for selectively outputting one of the plurality of pulse signals generated by said pulse generating means as the image scan clock signal; and setting means for arbitrarily setting the pulse signal to be selectively outputted from said clock selecting means responsive to the output signal of the photodetector.

2. A synchronizing device as claimed in claim 1 in which said setting means comprises a latch circuit for latching the plurality of pulse signals generated by said pulse generating means with a timing determined by the output signal of the photodetector when an image print enable signal is received, and a clock setting circuit for supplying the plurality of pulse signals generated by said pulse generating means to said clock selecting means, said clock selecting means comprising first terminals each supplied with one of the plurality of pulse signals set by said clock setting circuit and second terminals supplied with output signals of said latch circuit.

3. A synchronizing device as claimed in claim 2 in which said latch circuit outputs a number of first signals and a number of second signals which are complementary signals of the first signals, said number being identical to a number of said plurality of pulse signals generated by said pulse generating means.

4. A synchronizing device as claimed in claim 3 in which said clock selecting means comprises a logic circuit for outputting said one of the plurality of pulse signals by carrying out a logic operation on the first and second signals from said latch circuit and the plurality of pulse signals from said clock setting circuit.

5. A synchronizing device as claimed in claim 4 in which said clock selecting means comprises a plurality of AND gates each supplied with a pair of the first and second signals and one of the plurality of pulse signals from said clock setting circuit, and an OR gate supplied with output signals of said AND gates, an output signal of said OR gate being used as the output image scan clock signal of said clock selecting means.

6. A synchronizing device as claimed in claim 1 in which said setting means arbitrarily sets the pulse signal to be selectively outputted from said clock selecting means so as to compensate for an error in a mounting position of the photodetector.

7. A synchronizing device as claimed in claim 6 in which said constant phase corresponds to a minimum quantity with which the error in the mounting position of the photodetector can be corrected.

8. A synchronizing device for a color laser printer which comprises at least a first polygonal mirror for periodically deflecting a first laser beam which scans a first scanning plane, a first photodetector provided on the first scanning plane outside a first region in which a printing is made by the first laser beam for outputting an output signal when the first laser beam is detected, a second polygonal mirror for periodically deflecting a second laser beam which scans a second scanning plane and a second photodetector provided on the second scanning plane outside a second region in which a printing is made by the second laser beam for outputting an output signal when the second laser beam is detected, said output signal of the first photodetector being used for producing a first image scan clock signal which synchronizes each scan of the first lser beam, said output signal of the second photodetector being used for producing a second image scan clock signal which synchronizes each scan of the second laser beam, said synchronizing device comprising:

pulse generating means for generating a first plurality of pulse signals having a frequency identical to that of the first image scan clock signal and having phases which are successively shifted by a constant phase with respect to each other and a second plurality of pulse signals having a frequency identical to that of the second image scan clock signal and having phases which are successively shifted by the constant phase with respect to each other;

clock selecting means for selectively outputting one of the first plurality of pulse signals generated by said pulse generating means as the first image scan clock signal and for selectively outputting one of the second plurality of pulse signals generated by said pulse generating means as the second image scan clock signal; and setting means for arbitrarily setting the pulse signals to be selectively outputted from said clock selecting means responsive to the output signal of the first and second photodetectors.

9. A synchronizing device as claimed in claim 8 in which said one of the first pulse signals and said one of the second pulse signals outputted from said clock selecting means are in phase synchronism with each other so as to match starting positions of the first and second image scan clock signals.

10. A synchronizing device as claimed in claim 9 in which said constant phase corresponds to a minimum quantity with which the starting positions of the first and second image scan clock signals can be adjusted to match the starting positions.

* * * * *